(12) United States Patent
Bhargava et al.

(10) Patent No.: US 7,760,732 B2
(45) Date of Patent: Jul. 20, 2010

(54) CONSTANT TIME SIGNATURE METHODS FOR SCALABLE AND BANDWIDTH-EFFICIENT MULTICAST

(75) Inventors: Punit Bhargava, Sunnyvale, CA (US); Rina Panigrahy, Sunnyvale, CA (US); Sriram C. Krishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1130 days.

(21) Appl. No.: 11/149,877

(22) Filed: Jun. 10, 2005

(65) Prior Publication Data
US 2006/0221972 A1    Oct. 5, 2006

Related U.S. Application Data

(63) Continuation-in-part of application No. 11/095,737, filed on Apr. 1, 2005, now Pat. No. 7,554,928.

(51) Int. Cl.
*H04L 12/56* (2006.01)
*H04L 12/28* (2006.01)

(52) U.S. Cl. .................. 370/392; 370/263; 370/312; 370/370; 370/380; 370/432

(58) Field of Classification Search .............. 370/260, 370/263, 312, 356, 370, 380, 386, 389, 390, 370/432; 709/225, 228, 240, 247; 711/2, 711/200, 216
See application file for complete search history.

(56) References Cited

U.S. PATENT DOCUMENTS 6,098,157 A * 8/2000 Hsu et al. ................... 711/157

6,950,434 B1 * 9/2005 Viswanath et al. .......... 370/392
6,980,518 B1 * 12/2005 Sun et al. .................... 370/235

(Continued)

OTHER PUBLICATIONS

Jung Min Park; Chong, E.K.P.; Siegel, H.J., Efficient multicast packet authentication using signature amortization, 2002, Security and Privacy, 2002. Proceedings. IEEE 2002 pp. 227-240.*

(Continued)

*Primary Examiner*—Pankaj Kumar
*Assistant Examiner*—Lonnie Sweet
(74) *Attorney, Agent, or Firm*—Campbell Stephenson LLP

(57) ABSTRACT

A method, computer program product, system and apparatus are presented for reducing wasted bandwidth due to supercasting multicast cells through a router switch fabric. In one embodiment of the present invention, signatures of a switch fabric destination address are generated and compared. A signature is an information-rich representation of the fabric destination address that is generated using the fabric destination address. Therefore, supercasting can be minimized by combining fabric destination addresses with like signatures. Aspects of the present invention include generating the signatures using random permutation maps of the set of switch fabric ports or determining intersections of a fabric destination address with a selection of subsets of the switch fabric ports. Signature-based solutions for supercast minimization can be performed in a time-efficient manner and be implemented online, while solutions that can generate a more optimal solution but may take a longer time to perform, such as row-clustering, can be implemented off-line. A further aspect of the invention, incorporates an off-line row-clustering supercast minimization method with an on-line signature-based supercast minimization method.

21 Claims, 11 Drawing Sheets

U.S. PATENT DOCUMENTS

| | | | |
|---|---|---|---|
| 7,065,079 B1 | 6/2006 | Patra et al. | 370/390 |
| 2002/0196782 A1* | 12/2002 | Furukawa et al. | 370/352 |
| 2003/0198224 A1* | 10/2003 | Lee et al. | 370/392 |
| 2004/0146062 A1 | 7/2004 | Parikh et al. | 370/419 |
| 2004/0174820 A1* | 9/2004 | Ricciulli | 370/245 |
| 2005/0131912 A1 | 6/2005 | Lin et al. | 707/100 |
| 2005/0190765 A1 | 9/2005 | Gotoh et al. | 370/390 |
| 2005/0270983 A1* | 12/2005 | Remedios | 370/252 |
| 2006/0029092 A1 | 2/2006 | Luo et al. | 370/432 |

OTHER PUBLICATIONS

Canetti, R.; Garay, J.; Itkis, G.; Micciancio, D.; Naor, M.; Pinkas, B., Multicast security: a taxonomy and some efficient constructions, INFOCOM '99. 18th Annual Joint Conference of the IEEE Computer and Communications Soncietes, Proceeds, IEEE vol. 2, Mar. 21-25, 1999 pp. 708-716 vol. 2.*

Chung Kei Wong; Lam, S.S., Digital signatures for flows and multicasts, Networking, IEEE/ACM Transactions on vol. 7, Issue 4, Aug. 1999 pp. 502-551.*

M.G.A. Marsan et al., "Compression of Multicast Labels in Large IP Routers," IEEE Journal on Selected Areas in Communications, vol. 21, No. 4, pp. 630-641 (May 2003).

R. Peeters, "The Maxiumum Edge Biclique Problem is NP-Complete," Discrete Applied Mathematics, vol. 131, pp. 651-654 (2003).

N. McKeown et al., "Achieving 100% Throughput in an Input-Queued Switch," INFOCOM(1), pp. 296-302 (1996).

U. Feige, "Relations Between Average Case Complexity and Approximation Complexity," Proceedings of the 34th Annual ACM Symposium on Theory of Computing, pp. 534-543 (ACM Press 2002).

S. Keshav and R. Sharma, "Issues and Trends in Router Design," IEEE Communications Magazine, pp. 144-151 (May 1998).

* cited by examiner

|     |   |   |   |   |   |   |   |   |
|-----|---|---|---|---|---|---|---|---|
| 410 |   | 1 | 1 | 0 | 0 | 1 | 0 | 1 | 1 |
|     |   | 0 | 1 | 1 | 0 | 0 | 1 | 0 | 1 |
|     |   | 1 | 0 | 0 | 1 | 0 | 0 | 1 | 0 |
|     |   | 0 | 1 | 0 | 1 | 0 | 1 | 0 | 1 |

| | | | | | | | | | Cost |
|---|---|---|---|---|---|---|---|---|---|
| 420 | *1* | *1* | *1* | *0* | *1* | *1* | *1* | *1* | |
| 421 | 1 | 1 | ⓪ | 0 | 1 | ⓪ | 1 | 1 | 2 |
| 422 | ⓪ | 1 | 1 | 0 | ⓪ | 1 | ⓪ | 1 | 3 |
| 423 | 1 | ⓪ | ⓪ | 1 | ⓪ | ⓪ | 1 | ⓪ | 5 |
| 424 | ⓪ | 1 | ⓪ | 1 | ⓪ | 1 | ⓪ | 1 | 4 |

CONSTANT TIME SIGNATURE METHODS FOR SCALABLE AND BANDWIDTH-EFFICIENT MULTICAST

This application is a Continuation-In-Part of U.S. application Ser. No. 11/095,737, entitled "Clustering Methods For Scalable And Bandwidth-Efficient Multicast", filed Apr. 1, 2005 now U.S. Pat. No. 7,554,928, and naming Punit Bhargava, Rina Panigrahy, and Sriram Krishnan as inventors. This application is assigned to Cisco Technology, Inc., the assignee of the present invention, and is hereby incorporated by reference, in its entirety and for all purposes.

FIELD OF THE INVENTION

This invention relates to the field of information networks, and more particularly relates to transmitting multicast data packets within a router comprising a large number of network line cards.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase. In order to meet such demands, one method that has been used is logical distribution of nodes in a network to subnetworks containing nodes that exchange a substantial amount of traffic. The larger a network becomes, the greater the demand to subdivide that network becomes. Network nodes such as routers and switches become more complex as greater numbers of line cards leading to each subdivided network or to other network nodes are contained in a router or switch.

FIG. 1 is a block diagram showing a topology of a network. Network nodes 130(1)-(M) are connected to a node 110. Each network node in FIG. 1 may take the form of a router, switch, bridge, hub, or other network node such as a compute or disk server. For purposes of explanation, nodes 110 and 120 will be referred to as routers, it being understood that nodes 110 and 120 are not limited thereto. The connections between nodes 130(1)-(M) and router 110 permit the nodes to share data. Router 110 is connected to router 120 through link 150. Router 120 is further connected to a plurality of network nodes 140(1)-(N).

Variable identifiers "M" and "N" are used in several instances in FIG. 1 to more simply designate the final element of a series of related or similar elements. Repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "M" or "N" may hold the same or a different value than other instances of the same variable identifier.

Routers 110 and 120 can handle communications between segments of a large network. Such a network communication node can be responsible for establishing and providing tens of thousands of network connections.

FIG. 2 is a block diagram illustrating an exemplary router (e.g., router 110). In this depiction, the router includes a number (N) of line cards (210(1)-(N)) that are communicatively coupled to a switch fabric 220, which is also communicatively coupled to a processor 230. Line cards 210(1)-(N) each include a port processor 212(1)-(N) that is controlled by a line card CPU 219(1)-(N). Each port processor 212(1)-(N) is also communicatively coupled to an ingress packet processor 214(1)-(N) and an egress packet processor 218(1)-(N). The ingress and egress packet processors are communicatively coupled to a switch fabric interface 216(1)-(N) that is also communicatively coupled to the switch fabric 220. Each line card CPU 219(1)-(N) is also coupled to switch fabric interface 216(1)-(N), ingress packet processor 214(1)-(N), and egress packet processor (1)-(N).

When a packet is received by a router such as that illustrated in FIG. 2, the router can process the packet in the following manner. Upon receipt at a port, a packet is sent from one of the port processors 212(1)-(N) corresponding to the port at which the packet was received to an ingress packet processor 214(1)-(N). An ingress packet processor can analyze the IP multicast address of the packet to perform address lookups, as more fully set forth below. Once processed by an ingress packet processor, the packet can be sent through a switch fabric interface 216(1)-(N) to switch fabric 220. Switch fabric 220 can route the packet information to any line card 210(1)-(N) for egress processing according to a fabric destination address of the packet. Once received by a line card switch fabric interface 216(1)-(N), a packet can be analyzed by an egress packet processor 218(1)-(N), as more fully set forth below, and subsequently sent out through a port processor 212(1)-(N).

Switch fabric 220 can be implemented using a technique appropriate to the implementation. Common switch fabric technologies are busses, crossbars, and shared memories. A crossbar switch fabric, for example, can be thought of as 2n busses linked by n*n crosspoints. If a crosspoint is on, data on an input bus corresponding to the crosspoint is made available to a corresponding output bus. A processor 230 or a scheduler must turn on and off crosspoints for each set of packets transferred across the crossbar. Alternatively, one input bus can drive several output busses by having each crosspoint on, to achieve multicast, either selectively or in a permanent state. Another switch fabric technology is an asynchronous transfer mode (ATM) switch fabric core in which a permanent virtual circuit is established from each port to each other port. Incoming IP packets are fragmented into ATM cells and switched through the switch fabric and then the ATM cells are reassembled into packets before transmission.

A router, such as that illustrated in FIG. 2, can have a large number of line cards coupled to the switch fabric. Unique addressing of each of N-line cards can be accomplished by using $\log_2 N$ bits. For example, for 256 line cards, one needs eight bits to uniquely address each line card ($\log_2 256=8$). Such unique addressing can be found in unicast traffic.

Multicast routing protocols enable multicast transmission, i.e., one-to-many connections, by replicating packets close to the destination, obviating the need for multiple unicast connections for the same purpose, thereby saving network bandwidth and improving throughput. Similarly, within a router, multicast between line cards is enabled by a multicast capable switch fabric. A cell corresponding to an IP multicast packet is sent once from a source line card to the switch fabric, then the switch fabric sends the cell to all the destination line cards, obviating needless consumption of line card to switch fabric bandwidth resulting from multiple unicast cell transmissions for the same purpose. But multicast destination addressing to encompass every combination of destination line cards requires a bitmap fabric destination address of a length equal to the number of line cards (e.g., N bits, so for the above example of 256 line cards, one needs a 256-bit fabric destination address to be carried by each cell).

FIG. 3 is a simplified block diagram illustrating an example of packet processing that occurs within a router, such as that illustrated in FIG. 2. An ingress packet 310 arrives from a network connected to a line card 320 (line card 320 corresponds, for example, to one of line cards 210(1)-(N)). The ingress packet includes an IP destination address, along with other data such as the source of the packet and the substantive content of the packet. The illustrated packet destination address is a multicast address 315 formatted according to internet protocol (IP). In a network operating according to the multi-layer OSI network model, an IP packet such as that illustrated can be encapsulated in a lower level format packet, such as an ethernet packet. Ingress line card 320 will remove encapsulation that is unnecessary to the operation of the router. The line card will then assign a destination label identifying a destination address (i.e., switch ports the packet should be sent to) for the multicast address according to the results of a look up table (LUT) comparison performed by an ingress packet processor (e.g., 214(1)-(N)). LUT 325 contains a set of labels corresponding to prior received multicast addresses; such labels are internal to the router and only used in the context of the router. Line card 320 can then fragment the ingress packet into a number of cells 330 that (a) are of a length and format appropriate to the internal architecture of the router, and (b) each contain the label 335 generated from LUT 325. Such fragmentation can be performed, for example, in a switch fabric interface 216(1)-(N).

Cell 330 is then passed to the router switch fabric 340, wherein the cell is directed to appropriate egress ports. A single multicast cell can have multiple destination egress ports. Switch fabric 340 will replicate multicast cells and direct them to the appropriate destination ports, such operations being performed by a processor associated with the switch fabric (e.g., 230). The switch fabric can determine the destination egress ports for a cell by referencing a Label to Destination Table (LTDT) 345. LTDT 345 can contain an entry for each label, wherein an entry includes a bitmap of the egress ports from the switch fabric and reference to the bitmap provides information as to which switch egress ports the cell must be directed. Each label bitmap is a switch fabric destination address 350. Once duplicated and sent through switch fabric 340, cells exit the switch fabric and are sent to egress line cards 360(1)-(X) that are coupled to corresponding switch egress ports. The egress line cards can then remove the cell label and reconstruct the original packet in preparation for transmission on networks connected to the egress line cards (such an operation can be performed by, for example, switch fabric interface 216(1)-(N)). An egress packet processor (e.g., 218(1)-(N)) on the egress line card can perform another address lookup to determine which ports on the line card the packet should be transmitted, whether the egress line card should duplicate a packet for multiple multicast subscribers, or whether the egress line card should drop the packet (e.g., there are no multicast subscribers for the packet coupled to the egress line card). A port processor (e.g., 212(1)-(N)) on an egress line card will encapsulate the outgoing packet in an appropriate form for the attached network.

As stated above, the more destination line cards that are present in a router, the longer a switch fabric destination address will need to be in order to uniquely address each multicast address combination. To have such a long fabric destination address in each cell transmitted by a switch fabric will result in wasted space in each cell transported through the switch fabric (since, for example, a unicast cell, in a 256 line card router, need only 8 bits for a unique address versus 256 bits for a multicast fabric destination address). The more line cards present in a router, the more bandwidth consumed by switching such large fabric destination addresses.

Rather than provide a fabric destination address that contains enough bits to uniquely address every multicast combination, and therefore wasting switch fabric bandwidth, an address field of a length between $\log_2 N$ (a unicast address length) and N (a multicast bitmap length) can be chosen. Such a shorter fabric destination address field will not be able to uniquely address every combination of addresses directed to the N line cards. Over time, the number of multicast destinations that will need to be supported by the switch fabric will increase. Therefore, for several multicast destinations, the router switch will have to engage in "supercasting", wherein a multicast packet will ultimately be sent not only to subscribing line cards but also to one or more non-subscribing line cards that will ultimately drop the multicast packet.

Supercasting conserves bandwidth from a line card to the switch fabric by decreasing the length of the fabric destination address field of cells being transferred within the router switch fabric. But during supercasting, bandwidth from a switch fabric to attached line cards will be wasted due to the transmission of cells to nonsubscribing line cards. Further, bandwidth-impacting inefficiencies also occur at the nonsubscribing line cards as processing must occur in the line cards in order to drop the packets.

What is therefore desired is a method of assigning fabric destination addresses for multicast cells in a manner so that the amount of supercast, that is the amount of wasted bandwidth, is minimized, and thereby maximizing the useful throughput of the router.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention reduces wasted bandwidth due to supercasting multicast cells through a router switch fabric. Several methods have been developed to reduce such wasted bandwidth. Solutions that can be performed in a time-efficient manner can be implemented online, while solutions that can generate a more optimal solution but may take a longer time to perform can be implemented off-line.

If there are N links out of a router switch fabric, each multicast cell transmitted through the switch fabric can be sent to a subset of the N links (a fabric destination address). As stated above, for a large capacity router, a fabric destination address of N bits is too large to practically be used as a cell destination address. Therefore to conserve switch fabric bandwidth, an m-bit label corresponding to the fabric destination address is generated, wherein $\log_2 N < m < N$.

Switch fabric destination addresses are mapped to labels through a label-to-destination address table (LTDT) accessible to the switch fabric. As stated above, since a label contains fewer bits than is required to uniquely identify each fabric destination address corresponding to an IP multicast address, a label will correspond to more than one address and therefore supercasting will occur.

Figure 1:
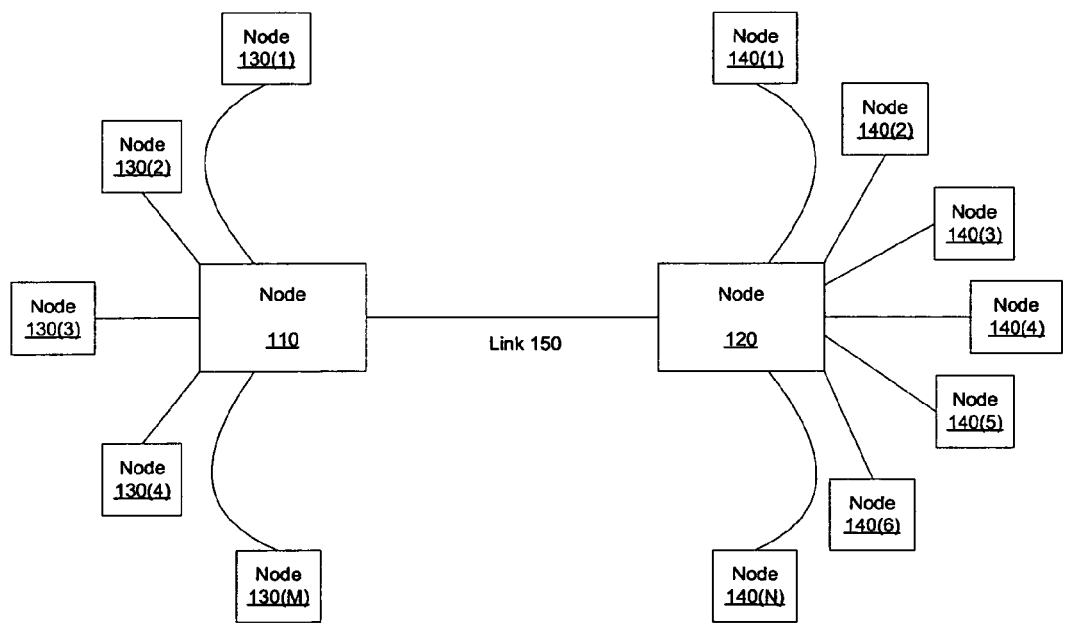
FIG. 1 is a block diagram showing a topology of a typical network.
Figure 2:
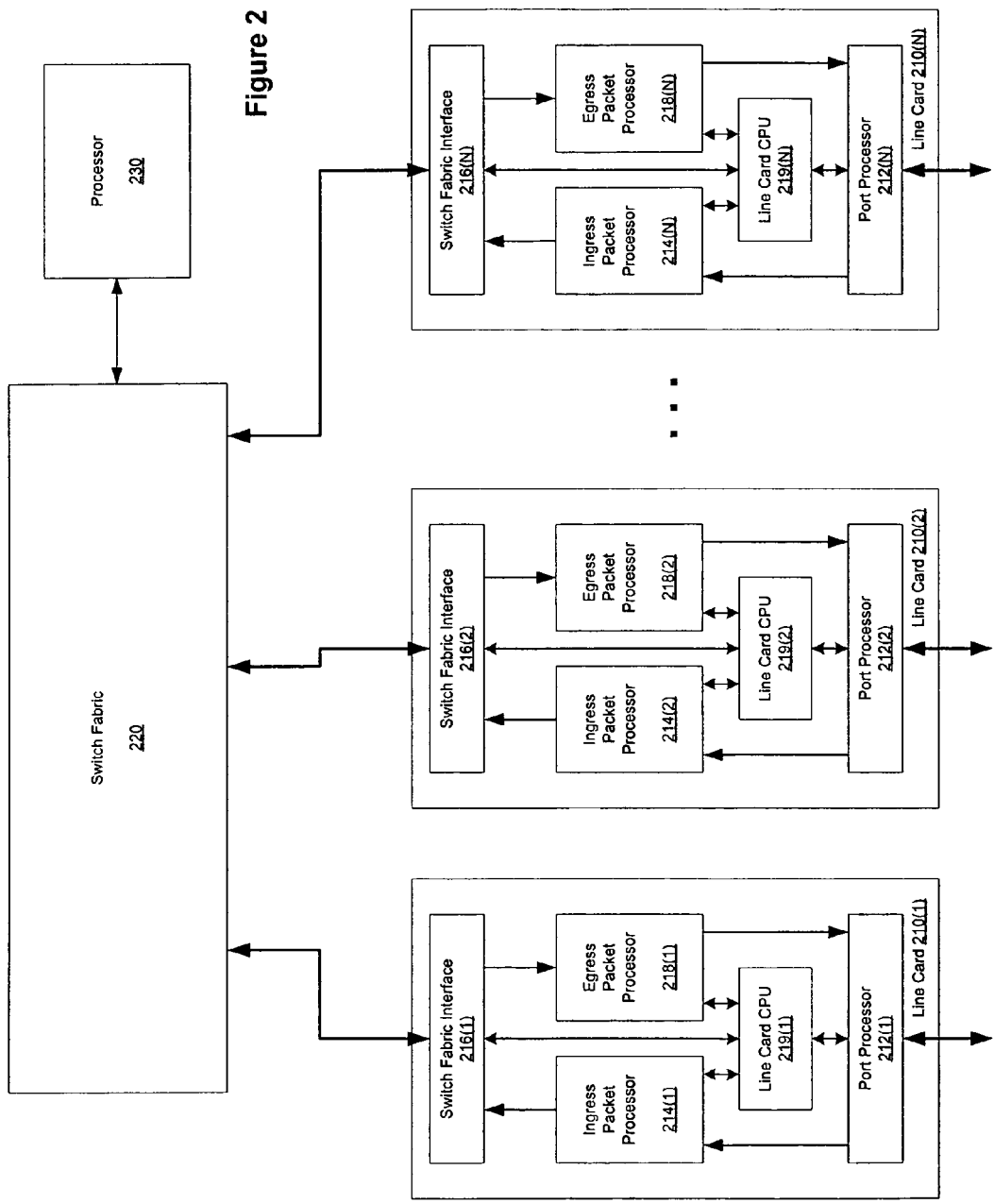
FIG. 2 is a block diagram illustrating a router.
Figure 3:
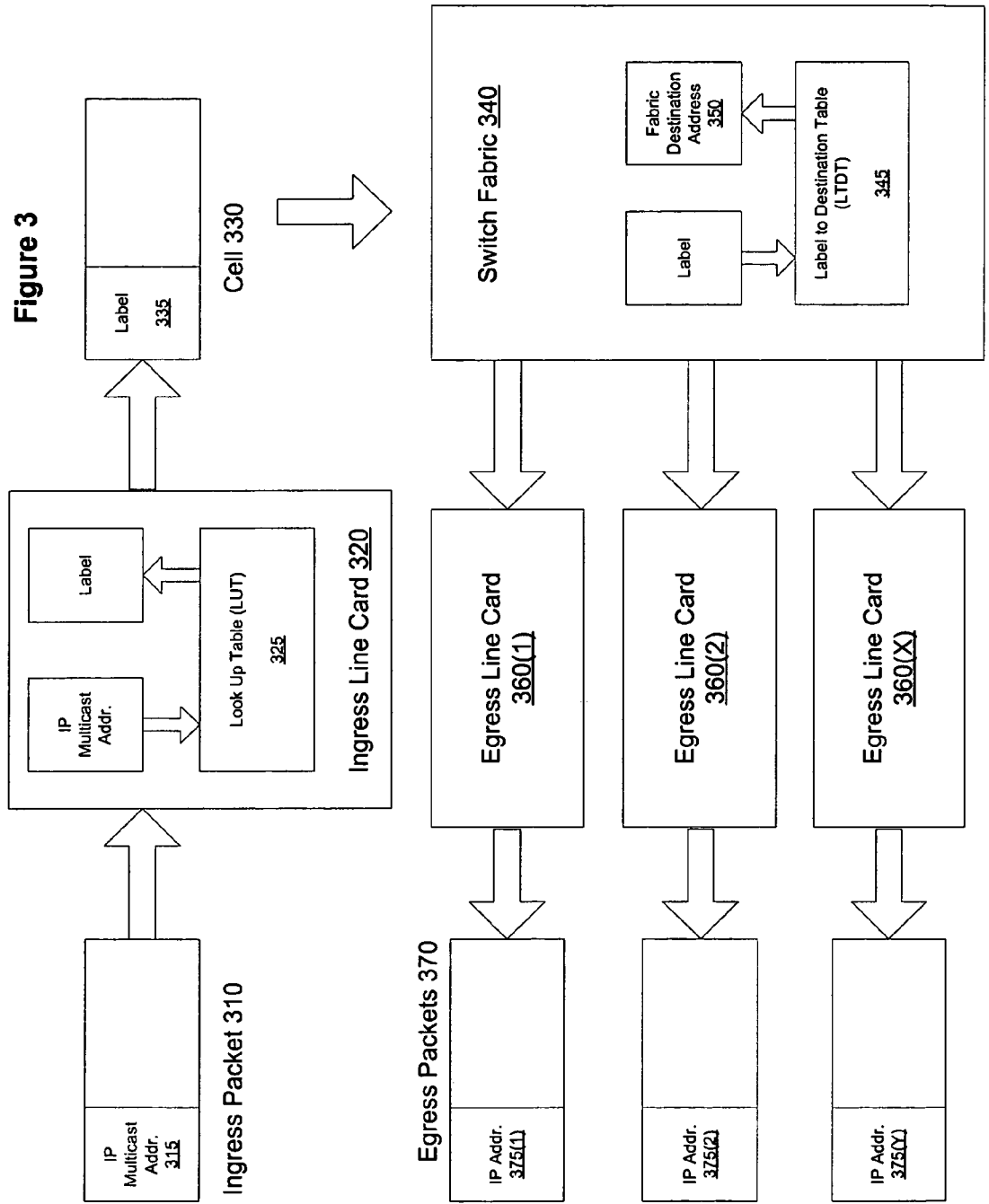
FIG. 3 is a block diagram illustrating certain operations of a router as a packet passes through the router.
Figures 4A, 4B:
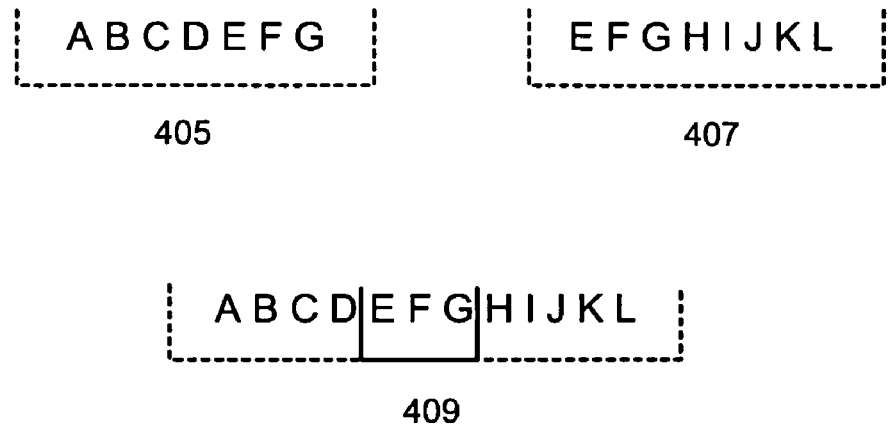
FIG. 4A is a simplified diagram illustrating the concept of supercasting as addressed by the present invention.
FIG. 4B is a simplified illustration of measuring costs associated with including a multicast fabric destination address with other multicast fabric destination addresses in accord with one embodiment of the present invention.

FIG. 4A demonstrates the concept of supercasting as addressed by the present invention. A first set of switch fabric destination ports {A, B, C, D, E, F, G} is represented in 405 and a second set of switch fabric destination ports {E, F, G, H, I, J, K, L} is represented in 407. If sets of switch fabric destination ports 405 and 407 were combined under the same label, then a cell multicast to that label would go to all the ports represented in 409 {A, B, C, D, E, F, G, H, I, J, K, L}. If subscribers to a multicast packet were represented by 405, then the traffic sent to the set of switch fabric ports {H, I, J, K, L} is the supercast traffic, or wasted bandwidth. Likewise, if subscribers to a multicast packet were represented by 407, then the traffic sent to the set of switch fabric ports {A, B, C, D} is supercast traffic. The objective is to map the number of possible fabric destination addresses (N) to the number of available labels (M=$_2$') so as to minimize the amount of wasted bandwidth due to supercasting.

An LTDT can have M unique entries (M=$2^m$). The LTDT fills as each new IP multicast destination address arrives. Each new multicast switch fabric destination address is associated with a label (an index to the LTDT) in the LTDT. Once each label in the LTDT is associated with a fabric destination address, any subsequent new fabric destination address will be combined (as discussed below) with an existing LTDT fabric destination address, thus creating a supercast fabric destination address. It is desired that the entry selected for combination will result in the least amount of bandwidth waste due to supercast.

In order to accomplish bandwidth waste minimization, one or more LTDT entries can be compared with a new multicast connection fabric destination address to evaluate any additional supercasting associated with combining the two addresses. Two elements contributing to the increase in bandwidth use resulting from the combination of a new fabric destination address with an existing LTDT entry are (1) the bandwidth increase incurred by the new fabric destination address by being combined with the LTDT entry, and (2) the bandwidth increase incurred by the LTDT entry due to the addition of the new fabric destination address.

A way of visualizing increase in bandwidth is shown in FIG. 4B. Fabric destination address entries in an LTDT are illustrated at 410 as a matrix of ones and zeros, wherein a one represents a subscribing switch fabric port and a zero represents an unsubscribing switch fabric port. A new multicast fabric destination address (11101111) (420) is compared to each table entry. Since bandwidth is wasted by sending packets to unsubscribing line cards, wasted bandwidth can be viewed as the inclusion of a one in a destination address bit where previously there was a zero. Thus, for each bit changed from a zero to a one, there is an increment in bandwidth waste. For example, the bandwidth waste of adding 420 to row 421 is 2, to row 422 is 3, and so on. These numbers represent the bandwidth increase incurred by the LTDT entry due to the addition of the new fabric destination address. The bandwidth increase incurred by new fabric destination address 420 in being combined with rows 421 or 422 is 0, and with rows 423 or 424 is 1.

Additional factors can be considered in a wasted bandwidth calculation, such as the amount of traffic already being supported by a fabric destination address. Each LTDT entry can be weighted by a factor proportional or dependent upon the amount of traffic supported by that entry. Such traffic information can be provided at the time the fabric destination address is entered, with such data being provided, for example, by a corresponding IP multicast protocol. The traffic information can be modified according to actual traffic experienced by the fabric destination address over time.

To facilitate determination of a increase in wasted bandwidth due to the addition of a fabric destination address to a current LTDT entry and the cost decrease due to a deletion of a fabric destination address form a row entry (when a multicast connection is torn down), the following information can be maintained in memory separate from the LTDT for each LTDT entry: (1) the number of original fabric destination addresses combined for the LTDT entry; (2) the number of zeros from the original fabric destination addresses in each bit; (3) the sum of the weighting (traffic) of the original entries comprising the LTDT entry; and, (4) the calculated LTDT entry.

Figure 5:
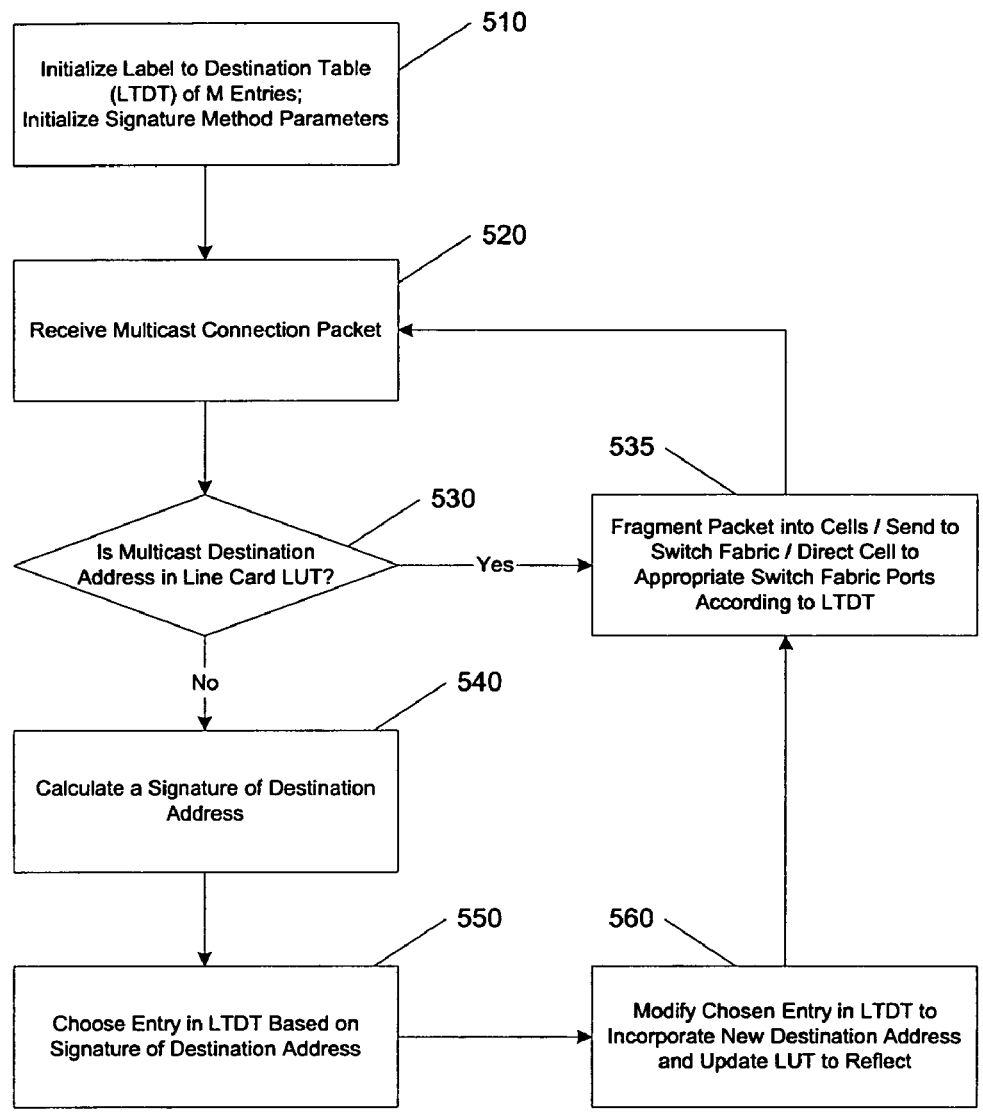
FIG. 5 is a simplified flow diagram illustrating a process to carry out wasted bandwidth minimization in accord with one embodiment of the present invention.

FIG. 5 is a simplified flow diagram illustrating a process to carry out constant time signature clustering of fabric destination addresses. Initially, an LTDT of M entries is initialized (e.g., each destination entry in the table is set to zeros) (510). This step can also include initialization of parameters associated with signature methods to be used in minimizing wasted bandwidth, as will be discussed more fully below. A multicast packet is received (520), and it is determined whether the IP multicast address in the packet is already associated with a label (530) using a line card lookup table (e.g., LUT 325). If the multicast address is already corresponds to a label, then the packet is fragmented into cells and sent to the switch fabric and directed to appropriate destination ports after looking up the fabric destination address in the LTDT (535).

If the IP multicast address in the packet is not already linked to a label, then a signature of a fabric destination address corresponding to the IP multicast address is calculated (540). Methods of calculating such a signature will be presented more fully below. The calculated signature can then be used to choose an entry in the LTDT, wherein the label of the entry corresponds to the calculated signature (550). The chosen LTDT entry is modified to incorporate the new fabric destination address and the line card LUT is also updated to reflect the correspondence between the IP multicast address and the label (560). The packet is then fragmented into cells incorporating the LTDT label, the cells are sent to the switch fabric and the packet is then sent to the appropriate switch fabric destination ports per the LTDT entry (535). Once an LTDT entry has been modified in this manner, packets sent to that label will be supercast, if necessary.

A signature, such as that calculated in 540, is a m-bit number calculated from the n-bit fabric destination address. A signature, in the present invention, is calculated as a function of the fabric destination address. The signature is an information-rich, m-bit representation of the information contained in the fabric destination address that is n bits, the number of line cards, in length. By "information-rich," it is meant that a signature provides sufficient destination information to permit the signature to be used to reduce wasted bandwidth caused by supercasting when combining the destination represented by a signature with another destination having the same signature. That is, if two fabric destination addresses have the same signature, then there will be sufficient similarity of destination ports implicated by the fabric destination addresses that supercasting can be minimized. Because, as will be shown below in more detail, a signature may not capture all of the port information of a fabric destination address, supercasting can occur when combining fabric destination addresses with the same signature.

According to embodiments of the present invention, two methods that can be used to calculate the signature involve calculating random permutation signatures (RPSs) and subset intersection signatures (SISs). These methods for deriving a signature from a fabric destination address are described more fully below. Once a signature has been calculated for a fabric destination address, that signature is matched to a LTDT entry label (as in 560). Upon matching, the destination information of the fabric destination address can be included in the LTDT entry (e.g., by ORing the destination information with the information already contained in the LTDT entry).

Random Permutation Signatures

Figure 6A:
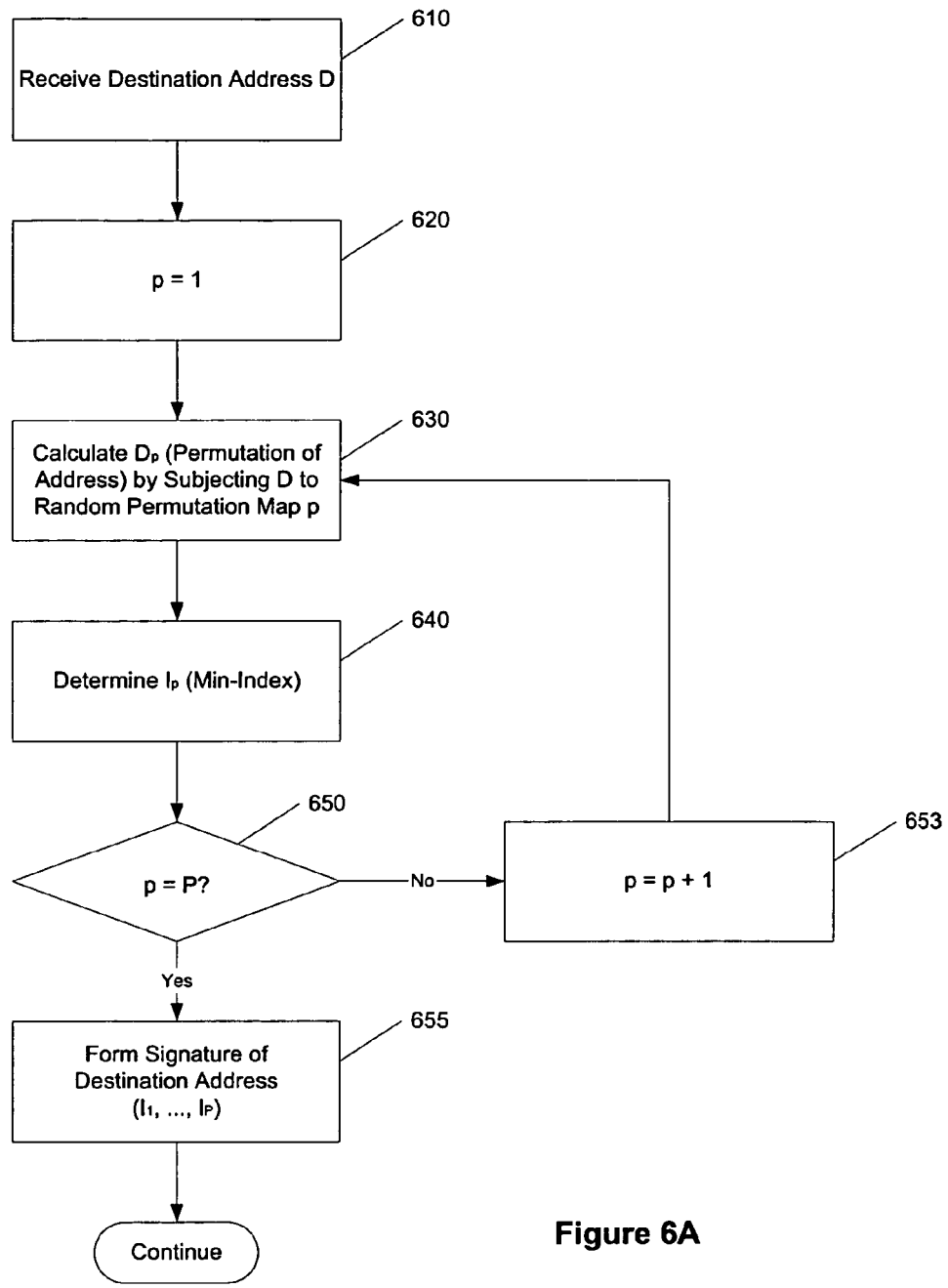
FIG. 6A is a simplified flow diagram illustrating a process for calculating random permutation signatures according to one embodiment of the present invention.

FIG. 6A is a simplified flow diagram illustrating a process for calculating a random permutation signature for a fabric destination address according to one embodiment of the present invention. Random permutation signatures are calculated and analyzed in 540 and 550, respectively, of FIG. 5. Initially, certain parameters are set, such as an index policy and P, the number of random permutations to be used in the calculation of signatures based on traffic characteristics inherited from higher level protocols or learned at the router. As stated above, such parameter initialization can occur in conjunction with initializing the LTDT (510). As will be more fully described below, the index policy is set to logical one or logical zero and calculating a random permutation signature of the fabric destination address can involve locating the bit position of the first bit of the random permutation of the address that matches the index policy.

The decision of whether to set an index policy to logical zero or logical one can be based upon the probability that any bit of any existing fabric destination address entered into the LTDT is set to logical one. That is, the probability that a line card is a destination in any fabric destination address. Existing fabric destination addresses include fabric destination addresses which were combined to form a supercasted fabric destination address in the LTDT. If there is less than a 50% chance that any bit of any existing fabric destination address in the LTDT is set to logical one, then the index policy should be set to logical one, and vice versa.

P, the number of random permutations to calculate for the fabric destination address, can be based on how close the probability of the chosen index policy is to 0.5. In the preferred embodiment, a maximum of m random permutations may be chosen. The closer the probability the index policy is to 0.5, the larger number of random permutation signatures should be calculated, and vice versa. At this time, P random permutations of the line cards are calculated and retained as maps to be used in the calculation of fabric destination address permutations $D_p$ as discussed below. The values of the index policy and P can be set statically during initialization of the LTDT, or these values can be modified in response to statistical analysis of fabric destination addresses received by the device over time and given effect at times when the LTDT is reset.

The receipt of a new fabric destination address D begins the process of calculating a signature (610). As the process of calculating a signature begins, a counter p can be initialized (620). A random permutation $D_p$ of the fabric destination address D is calculated based on a permutation p (630). Such random permutations are calculated by reordering the bits in the fabric destination address according to the randomly generated maps that were calculated at the time of initialization (510). It is noted that the n bits of the fabric destination address correspond to the n line cards, respectively, of the router. In other words, the first most significant (i.e., leftmost) bit of the fabric destination address D corresponds to a first line card, the second most significant bit of the fabric destination address D corresponds to a second line card, and so on. Each random permutation $D_p$ includes n bits, and the number of bits set to logical one in each $D_p$ equals the number of bits in the fabric destination address set to logical one. However, the n bits of each random permutation $D_p$ do not correspond to the n line cards, respectively. For example, the first most significant bit of $D_p$ may correspond to the fifth line card, the second most significant bit of the $D_p$ may correspond to the third line card, and so on.

From DP, a min-index $I_p$ is determined (640). The min-index $I_p$ corresponds to the bit location of the first entry in DP that equals the index policy. In one embodiment, each consecutive bit of DP starting with the most significant (i.e., leftmost) bit is compared to the index policy until a match is found. The min-index $I_p$ is set to the binary identification of the index policy matching bit in $D_p$. If counter p is less than P, the set number of random permutations to be calculated for the fabric destination address (650), then counter p is incremented (653) and a new $D_p$ is calculated (by using the random permutation map corresponding to p). For each of the random permutations to be calculated, a different randomly generated mapping is performed, and a different min-index is determined.

If P random permutations of the fabric destination address have been calculated, then a signature of the fabric destination address is formed from the min-indexes $I_1, \ldots, I_P$ (655). Since the signature for the fabric destination address should have m-bits, an appropriate number of bits can be taken from each of the min-indexes $I_1, \ldots, I_P$ before they are concatenated. Specifically, m/P bits from each of min-indexes $I_1, \ldots, I_P$ are concatenated to form the signature. In one embodiment of the present invention, the m/P least significant bits, that is the right-most bits, of min-indexes $I_1, \ldots, I_P$ are concatenated to form the signature.

Subset Intersection Signatures

Figure 6B:
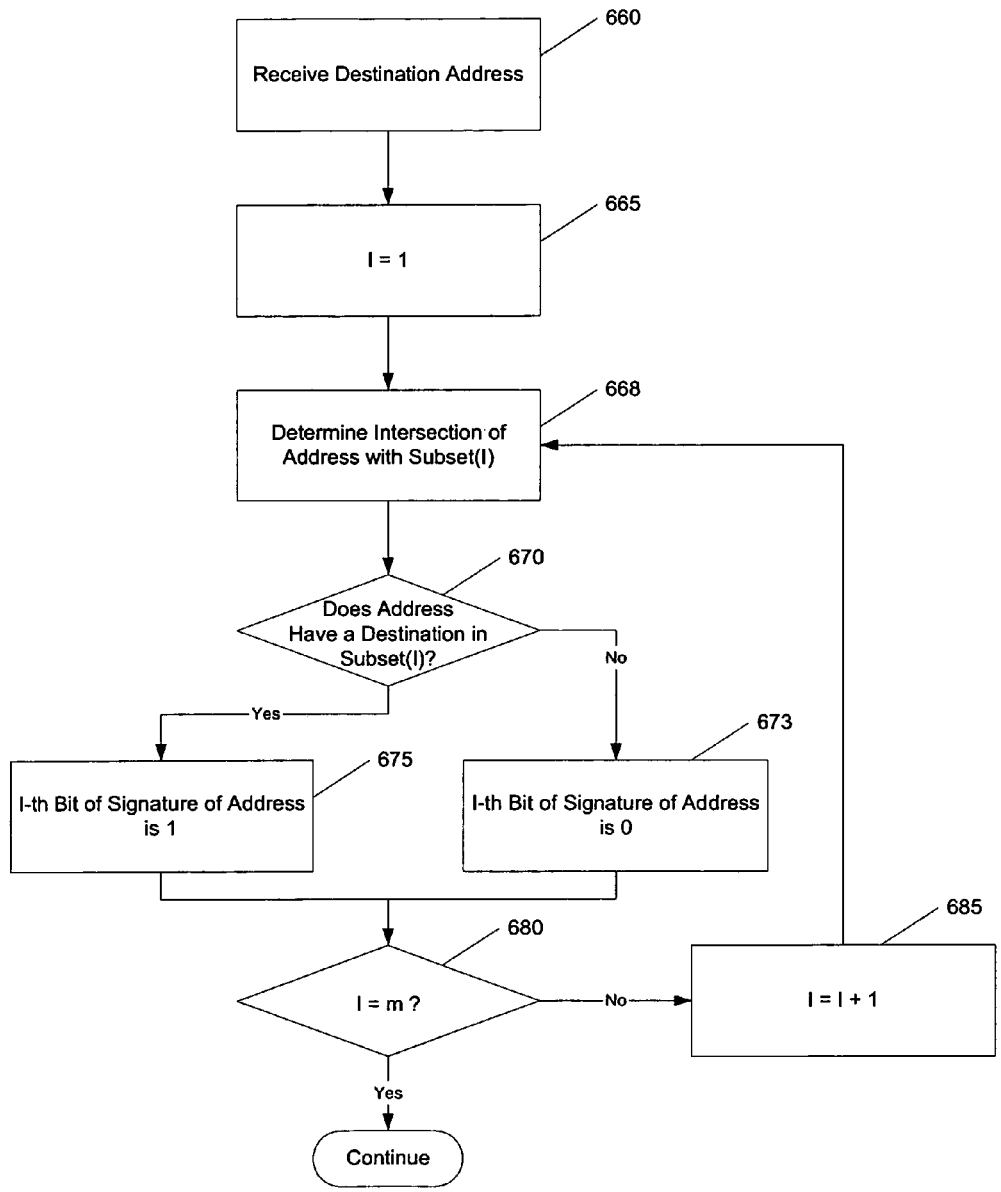
FIG. 6B is a simplified flow diagram illustrating a process for calculating subset intersection signatures according to one embodiment of the present invention.

FIG. 6B is a simplified flow diagram illustrating an alternate process for calculating signatures of fabric destination addresses in accord with another embodiment of the present invention. FIG. 6B illustrates generating subset intersection signatures (SISs). The SIS method involves choosing m subsets of the n line cards in the router. The intersection of the address with the subsets is determined. More particularly, the destination line cards of the address are compared to those line cards represented by the subset to determine whether there is a match (i.e., whether a bit in the subset of the address is set to a logical one in the fabric destination address). If there is a bit set to logical one, then the signature bit corresponding to that subset is set to logical one, otherwise it is set to a logical zero. This process is repeated with the next subset of line cards and bits in the fabric destination address corresponding to the next subset of line cards until all m subsets of the line cards have been compared to corresponding bits in the fabric destination address.

The subset intersection signature's method begins by selecting m subsets of the n line cards. Such selection can be performed at the time the LTDT and signature method parameters are initialized (510). The size of each subset can be determined based upon the probability that any bit in any fabric destination address is set to logical one. If p is the probability that any bit in any fabric destination address is set to logical one, then each of the m subsets can be chosen with 1/p line cards. This can ensure that each of the m bits in the signature has a reasonable probability of being a zero or one, thereby creating information-rich signatures. The value of p can be set statically during initialization of the LTDT or modified in response to statistical analysis of fabric destination addresses received by the device over time and given effect when the LTDT is reset.

As the SIS process begins, a fabric destination address D is received (660). A counter I can be initialized (665). The intersection of the fabric destination address for which a signature is being generated and Subset(I) (which was generated at initialization (510)) is determined (668). It is then determined whether the address has a destination in Subset(I) (670). In other words, in 670 it is determined if any of the bits of the fabric destination address that correspond to line cards Subset(I) is set to logical one. If the address does not have a destination in Subset(I), then the Ith bit of the signature of D is "0" (673), otherwise the Ith bit of the signature of D is "1" (675). A determination is then made as to whether each subset has been reviewed (680), and if not, the counter I is incremented (685) and the next Subset(I) is evaluated. If each subset has been evaluated then the signature is complete and the LTDT entry to add the fabric destination address to has been identified.

The method discussed above can be performed both on-line and off-line to update the LTDT. In addition, an alternative method of wasted bandwidth minimization can be performed off-line from that performed on-line. In order to potentially achieve a greater minimization of wasted bandwidth, "greedy-row clustering" methods, such as those disclosed in U.S. patent application Ser. No. 11/095,737, can be performed off-line.

Figure 7:
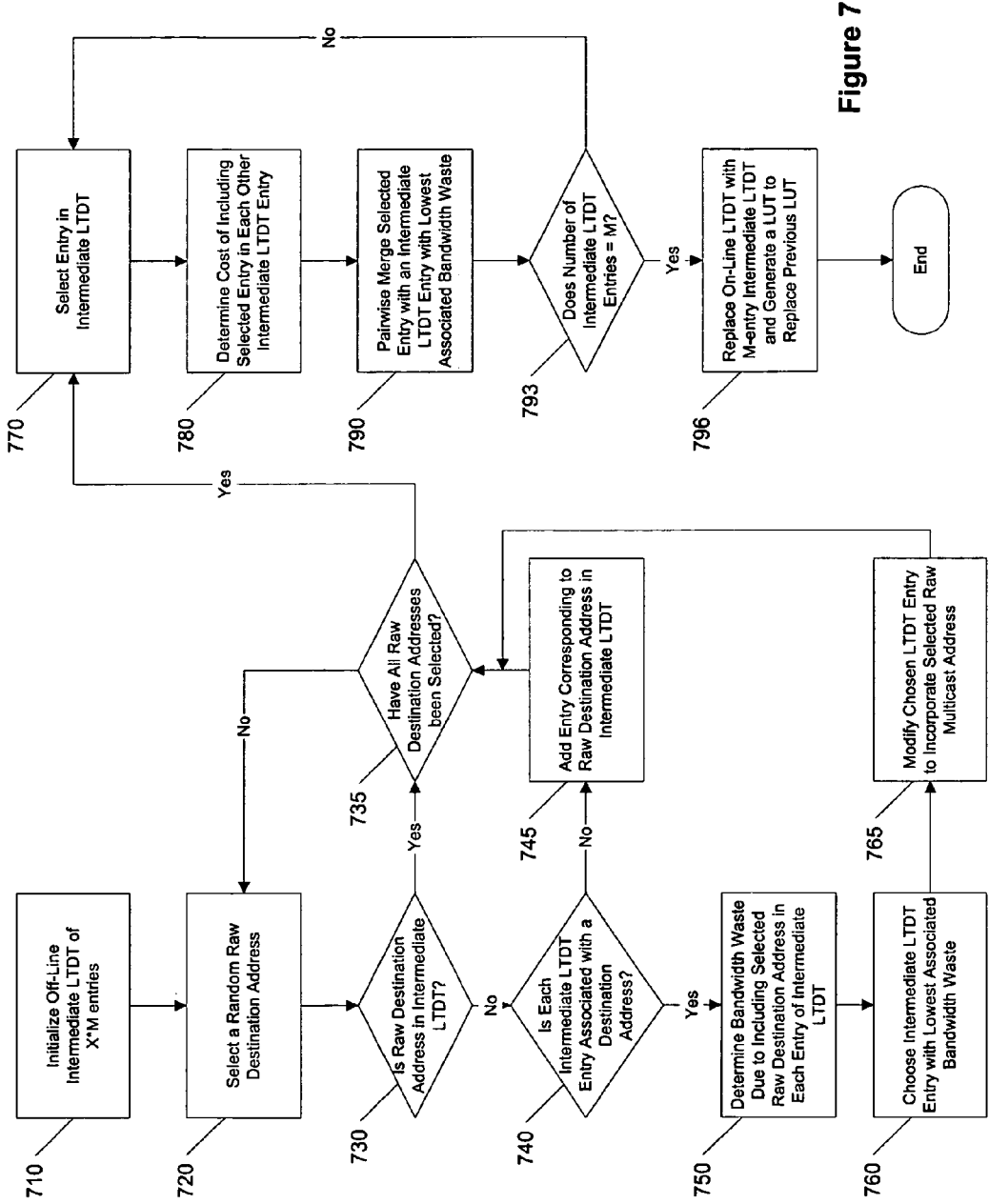
FIG. 7 is a simplified flow diagram illustrating an off-line row clustering method in accord with one embodiment of the present invention.

FIG. 7 is a simplified flow diagram illustrating one such off-line row clustering method in accord with one embodiment of the present invention, as more fully described in U.S. patent application Ser. No. 11/095,737, which is incorporated by reference herein for all that it teaches. This method is called "two-greedy row clustering." The calculations in this method are performed on tables that are not used by the switch fabric until the tables specifically replace the on-line LTDT. Such off-line methods can be more compute intensive and time-consuming than on-line methods, but will not affect the performance of the switch fabric since the methods are run off-line. Further, the invention is not limited to using the same LTDT calculation method off-line as is used on-line.

An intermediate LTDT can be initialized off-line (710), wherein the intermediate LTDT can have a multiple X*M entries, where X>1 and M is the number of LTDT entries in the on-line table. Using a multiple of the number of on-line LTDT entries in the off-line intermediate table permits an initially finer level of bandwidth waste minimization than an M-entry LTDT permits. The inventors have found X=4 to give good results, both analytically and experimentally.

A random raw (not combined with any other fabric destination address) fabric destination address is selected from memory (720) and it is determined whether the fabric destination address is already entered in the intermediate LTDT (730). If so, then it is determined whether all the raw fabric destination addresses have been selected (735). If all the raw fabric destination addresses have not been selected, then a new raw fabric destination address is selected. If all the raw fabric destination addresses have been selected, the second stage of the method is performed, as will be presented below.

If the raw fabric destination address is not already entered in the intermediate LTDT, then it is determined whether each entry of the intermediate LTDT is associated with a fabric destination address (740). If not, then the raw fabric destination address is entered into the intermediate LTDT (745).

If each intermediate LTDT entry is associated with a fabric destination address, then a wasted bandwidth calculation (such as that discussed above for the greedy-row clustering method) is made to determine the bandwidth waste due to adding the selected raw fabric destination address to each entry of the intermediate LTDT (750). The intermediate LTDT entry with the lowest associated bandwidth waste due to including the selected raw fabric destination address is chosen (760) and the intermediate LTDT entry is modified to include the fabric destination address (765).

Once all raw fabric destination addresses have been selected and included in the X*M-entry intermediate LTDT (735), the number of entries in the intermediate LTDT can be reduced to M-entries (or a selected smaller number, if desired) in preparation for bringing an optimized LTDT on-line. An entry in the intermediate LTDT is selected (770) and bandwidth waste due to including the entry into each other entry in the intermediate LTDT is determined (780). A pairwise merge is performed to include the selected intermediate LTDT entry into the entry with the lowest associated bandwidth waste (790). If the number of entries in the intermediate LTDT is not equal to M (793), then another entry is selected and the pairwise merging process continues until the intermediate LTDT has M entries. After this second greedy-row clustering/pairwise merge process, the intermediate LTDT is ready to replace the on-line LTDT (796).

Figure 8:
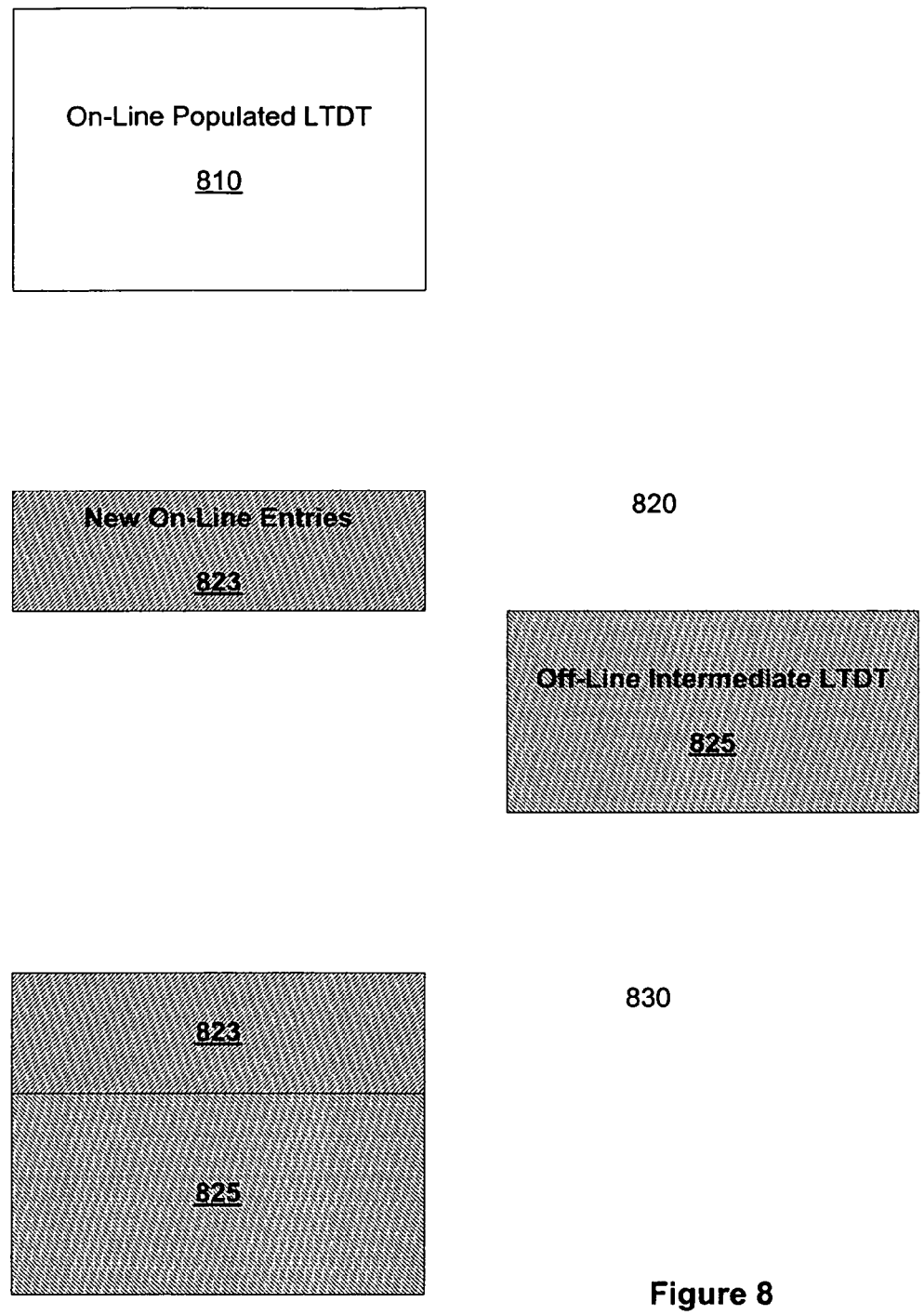
FIG. 8 is a simplified block diagram illustrating the state of an on-line LTDT before/during/after generation and replacement by an off-line intermediate LTDT in accord with one embodiment of the present invention.

FIG. 8 is a simplified block diagram illustrating the state of an on-line LTDT before/during/after generation and replacement by an off-line intermediate LTDT. An on-line LTDT (810) can be generated by an on-line method as described above. When an off-line intermediate LTDT is generated (825), fabric destination addresses received during the period of generation are entered using an on-line method such as a constant time signature method into the on-line LTDT (823), which has been otherwise reinitialized as in 510. At this stage, the initialization parameters for the signature methods can be reset according to statistical analysis of fabric destination addresses received by the device over time. Once the off-line intermediate LTDT is ready for on-line use, the intermediate LTDT can be appended to the entries in the on-line LTDT (830). Once the LTDT is formed, subsequently received fabric destination addresses can continue to be included in the on-line section of the LTDT (823).

An Example Computing and Network Environment

As shown above, the present invention can be implemented using a variety of computer systems and networks. An example of one such computing and network environment is described below with reference to FIGS. 9 and 10.

Figure 9:
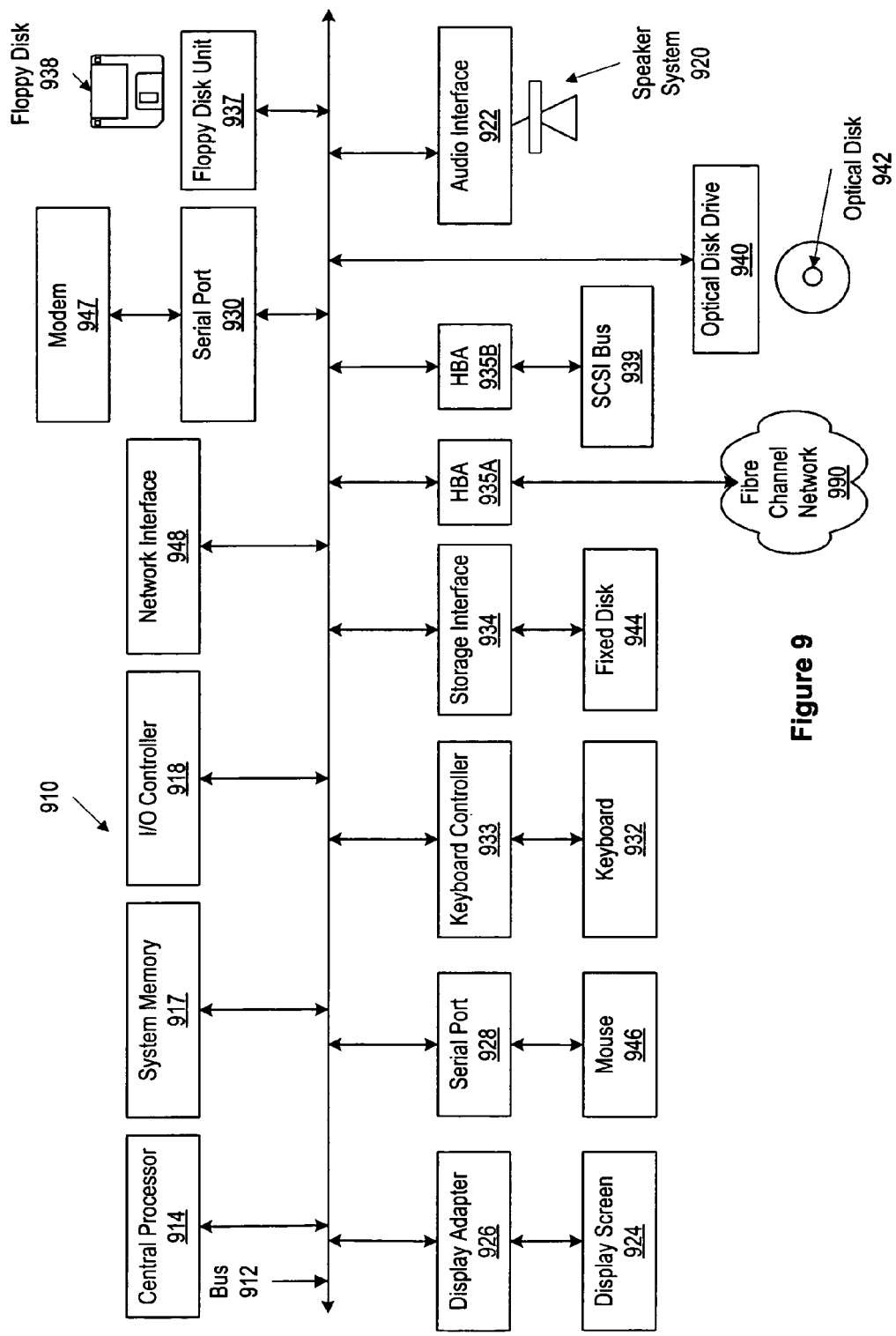
FIG. 9 depicts a block diagram of a computer system suitable for implementing embodiments of the present invention.

FIG. 9 depicts a block diagram of a computer system 910 suitable for implementing the present invention. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a fibre channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a non-transitory computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard non-transitory computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 9 need not be present to practice the present invention. The devices and subsystems can be interconnected in different ways from that shown in FIG. 9. The operation of a computer system such as that shown in FIG. 9 is readily known in the art and is not discussed in detail in this application. Code to implement the present invention can be stored in non-transitory computer-readable storage media such as one or more of system memory 917, fixed disk 944, optical disk 942, or floppy disk 938. Additionally, computer system 910 can be any kind of computing device, and so includes personal data assistants (PDAs), network appliance, X-window terminal or other such computing devices. The operating system provided on computer system 910 may be MS-DOS®, MS-WINDOWS®, OS/2®, UNIX®, Linux®, or another known operating system. Computer system 910 also supports a number of Internet access tools, including, for example, an HTTP-compliant web browser having a JavaScript interpreter, such as Netscape Navigator®, Microsoft Internet Explorer®, and the like.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
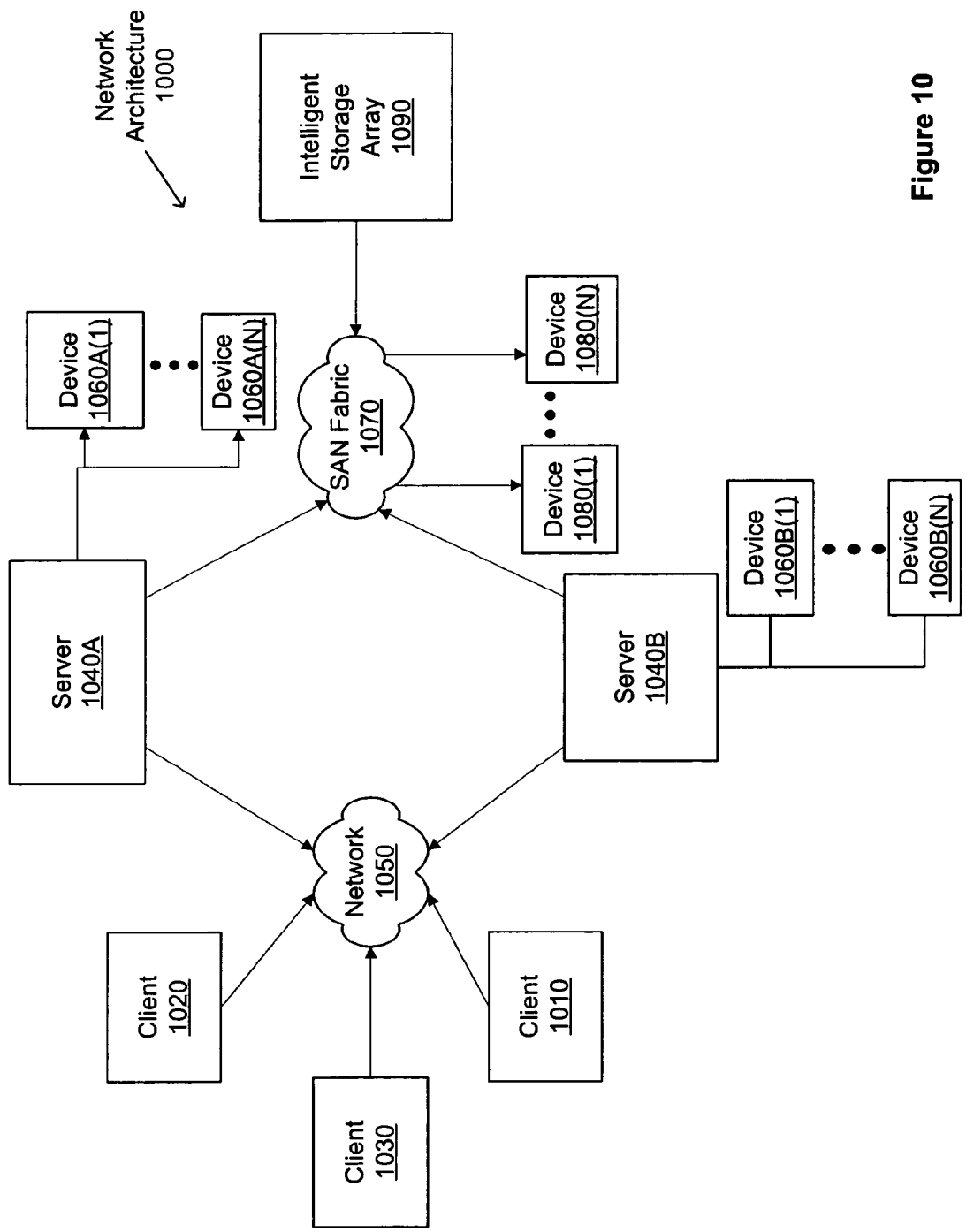
FIG. 10 depicts a block diagram of a network architecture suitable for implementing embodiments of the present invention.

FIG. 10 is a block diagram depicting another example of a network architecture 1000 in which client systems 1010, 1020 and 1030, as well as storage servers 1040A and 1040B (any of which can be implemented using computer system 910), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so on by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1) (N), 1080(1)-(N) or intelligent storage array 1090. FIG. 10 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 910). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a non-transitory machine-readable or non-transitory computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, irremovably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method performed by a switch fabric comprising:
    calculating a first signature from a first fabric destination address of the switch fabric, wherein
        the first fabric destination address corresponds to a first multicast group address,
        the first multicast group address is received in a multicast packet, and
        performing said calculating to reduce supercasting in the switch fabric associated with packets comprising the first multicast group address;
    comparing the first signature to a second signature, wherein
        the second signature is a label in a label-to-destination address table (LTDT); and
    updating an LTDT entry with a combination of the first fabric destination address and a second fabric destination address, if the first signature matches the second signature, wherein
        the LTDT entry corresponds to the second signature, and
        the second fabric destination address is associated with the second signature.

2. The method of claim 1 further comprising:
    calculating the second signature from a second fabric destination address, wherein
        the second fabric destination address corresponds to a second multicast group address.

3. The method of claim 1 wherein calculating the first signature comprises:
    performing a first permutation of the first fabric destination address;
    determining a location of a first occurrence of an index policy in the first permutation of the first fabric destination address; and
    including in the first signature a number of bits of a binary index representing the location of the first occurrence of the index policy in the first permutation of the first fabric destination address.

4. The method of claim 3 wherein calculating the first signature further comprises:
    setting the index policy based on a probability that a bit in the first fabric destination address is set to a logical one.

5. The method of claim 3 wherein calculating the first signature further comprises:
    performing a second permutation of the first fabric destination address, wherein the second permutation is distinct from the first permutation;
    determining a location of the first occurrence of the index policy in the second permutation of the first fabric destination address; and
    including in the first signature a number of bits of a binary index representing the location of the first occurrence of the index policy in the second permutation of the first fabric destination address.

6. The method of claim 5, wherein
    the first and second permutations of the first fabric destination address are random permutations of the first fabric destination address, and
    the second permutation is distinct from the first permutation.

7. The method of claim 3 further comprising:
performing a plurality of permutations of the first fabric destination address, wherein
a number of the plurality of permutations is proportional to the probability of bits in the first fabric destination address equaling the index policy.

8. The method of claim 1, wherein
the first fabric destination address identifies a first set of switch fabric ports.

9. The method of claim 8 wherein calculating the first signature comprises:
selecting a first subset of all switch fabric ports of a switch fabric;
determining whether the first set of switch fabric ports intersects the first subset of all switch fabric ports; and
setting a first bit in the first signature to a one if the first set of switch fabric ports intersects the first subset of the switch fabric ports, otherwise setting the first bit to a zero, wherein
the first bit in the first signature corresponds to the first subset of all switch fabric ports.

10. The method of claim 9, wherein
the first subset of all switch fabric ports comprises a number of elements, wherein
the number of elements is inversely proportional to a probability that a switch fabric port is a destination of the first or second fabric destination address.

11. The method of claim 1, wherein
said calculating a first signature and said combining are performed on-line, wherein
the combined first fabric destination address and second fabric destination address are used by a switch fabric to transmit a data packet comprising a multicast group address corresponding to the first fabric destination address.

12. The method of claim 11 further comprising:
associating the combined first and second fabric destination addresses with a plurality of fabric destination addresses used by the switch fabric; and
generating a second plurality of fabric destination addresses off-line, wherein
the second plurality of fabric destination addresses is not used by the switch fabric to transmit data packets prior to an incorporation of the second plurality of fabric destination addresses with the first plurality of fabric destination addresses.

13. The method of claim 12 wherein said generating a second plurality of fabric destination addresses off-line comprises one or more of random permutation signatures, subset intersection signatures, and row clustering.

14. A system comprising:
a plurality of network line cards, wherein
each network line card is configured to receive a first network packet,
each network line card is configured to transmit a second network packet, wherein
the first network packet comprises a first multicast group address;
a switch fabric comprising a plurality of ports, wherein
each of the plurality of ports is coupled to a corresponding one of the plurality of network line cards; and
a processor coupled to the switch fabric and configured to
calculate a first signature from a first fabric destination address, wherein
the first fabric destination address corresponds to a first multicast group address, and
performing said calculating to reduce supercasting in the switch fabric associated with packets comprising the first multicast group address,
compare the first signature to a second signature, wherein
the second signature is a label in a label-to-destination address table (LTDT) stored in a memory coupled to the processor, and
update an LTDT entry with a combination of the first fabric destination address and a second fabric destination address, if the first signature matches the second signature, wherein
the LTDT entry corresponds to the second signature, and
the second fabric destination address is associated with the second signature.

15. The system of claim 14 further comprising:
the processor further configured to
perform a first permutation of the first fabric destination address,
determine a location of a first occurrence of an index policy in the first permutation of the first fabric destination address, and
include in the first signature a number of bits of a binary index representing the location of the first occurrence of the index policy in the first permutation of the first fabric destination address.

16. The system of claim 14 further comprising:
the processor further configured to
select a first subset of the plurality of switch fabric ports,
determine whether a first set of switch fabric ports intersects the first subset of the plurality of switch fabric ports, wherein
the first fabric destination address identifies the first set of switch fabric ports, and
set a first bit in the first signature to a one if the first set of switch fabric ports intersects the first subset of the switch fabric ports, otherwise setting the first bit to a zero, wherein
the first bit in the first signature corresponds to the first subset of the plurality of switch fabric ports.

17. The system of claim 14 further comprising:
the processor further configured to
perform said calculating the first signature and said combining on-line, wherein
the combined first fabric destination address and second fabric destination address are used by the switch fabric to transmit a data packet comprising a multicast group address corresponding to the first fabric destination address,
associate the combined first and second fabric destination addresses with a plurality of fabric destination address used by the switch fabric, and
generate a second plurality of fabric destination addresses off-line, wherein
the second plurality of fabric destination addresses is not used by the switch fabric to transmit data packets prior to an incorporation of the second plurality of fabric destination addresses with the first plurality of fabric destination addresses.

18. A non-transitory computer-readable storage medium comprising:
a first set of instructions, executable by a processor in a network communication node, and configured to calculate a first signature from a first fabric destination address, wherein the first fabric destination address corresponds to a first multicast group address, the first multicast group address is received in a multicast packet, and performing said calculating to reduce supercasting in the switch fabric associated with packets comprising the first multicast group address;

a second set of instructions, executable by the processor, and configured to compare the first signature to a second signature, wherein the second signature is a label in a label-to-destination address table (LTDT) stored in a memory coupled to the processor; and a third set of instructions, executable by the processor, and configured to update an LTDT entry with a combination of the first fabric destination address and a second fabric destination address, if the first signature matches the second signature, wherein the LTDT entry corresponds to the second signature, and the second fabric destination address is associated with the second signature.

19. The non-transitory computer-readable storage medium of claim 18 wherein the first set of instructions comprises:

a fourth set of instructions, executable by the processor, and configured to perform a first permutation of the first fabric destination address;

a fifth set of instructions, executable by the processor, and configured to determine a location of a first occurrence of an index policy in the first permutation of the first fabric destination address; and a sixth set of instructions, executable by the processor, and configured to include in the first signature a number of bits of a binary index representing the location of the first occurrence of the index policy in the first permutation of the first fabric destination address.

20. The non-transitory computer-readable storage medium of claim 18 wherein the first set of instructions comprises:

a seventh set of instructions, executable by the processor, and configured to select a first subset of all switch fabric ports of a switch fabric;

an eighth set of instructions, executable by the processor, and configured to determine whether a first set of switch fabric ports intersects the first subset of all switch fabric ports, wherein the first fabric destination address identifies the first set of switch fabric ports; and a ninth set of instructions, executable by the processor, and configured to set a first bit in the first signature to a one if the first set of switch fabric ports intersects the first subset of the switch fabric ports, otherwise configured to set the first bit to a zero, wherein the first bit in the first signature corresponds to the first subset of all switch fabric ports.

21. An apparatus comprising:

a plurality of network line cards, wherein each network line card is disposed for receiving a first network packet, wherein the first network packet comprises a first multicast group address, and each network line card is disposed for transmitting a second network packet;

a switch fabric comprising a plurality of ports, wherein each of the plurality of ports is coupled to a corresponding one of the plurality of network line cards;

means for calculating a first signature from a first fabric destination address, wherein the first fabric destination address corresponds to the first multicast group address, and performing said means for calculating to reduce supercasting in the switch fabric associated with packets comprising the first multicast group address;

means for comparing the first signature to a second signature, wherein the second signature is a label in a label-to-destination address table (LTDT); and means for updating an LTDT entry with a combination of the first fabric destination address and a second fabric destination address, if the first signature matches the second signature, wherein the LTDT entry corresponds to the second signature, and the second fabric destination address is associated with the second signature.

* * * * *